Patented Feb. 20, 1940

2,191,053

UNITED STATES PATENT OFFICE 2,191,053

PREPARATION OF ADDITION PRODUCTS OF ACETYLENE

Hans Walter, Frankfort-on-the-Main, Germany, assignor to Deutsche Gold- und Silber Scheideanstalt vormals Roessler, Frankfort-on-the-Main, Germany, a corporation of Germany No Drawing. Application November 13, 1935, Serial No. 49,551. In Germany May 24, 1930

13 Claims. (Cl. 260—498)

This invention relates to the production of vinyl compounds such as vinyl esters and vinyl ethers and more particularly to a catalytic process for the production of vinyl compounds by reacting organic hydroxy and carboxy compounds with acetylene.

It is known to produce vinyl compounds by reacting acetylene with organic hydroxy and carboxy compounds in the presence of catalysts. For example, vinyl acetate may be made by passing a mixture of acetylene and acetic acid vapor over a catalyst such as a mercury salt, or a salt of other heavy metals. This reaction also may be carried out in the liquid phase by passing acetylene into an acetic acid solution containing such catalysts. Vinyl ethers may be made by similarly reacting organic hydroxy compounds with acetylene; for example acetylene and ethyl alcohol may be reacted to prepare ethyl vinyl ether. The difficulty heretofore encountered in preparing vinyl compounds by the addition reactions of acetylene has been that the reaction is required to be carried at relatively low temperatures e. g. not greater than about 270° C.; otherwise tarry materials, polymers, croton aldehyde and other undesirable reaction products will be simultaneously formed in excessive amounts, thus decreasing the yield and making it difficult to obtain the pure product.

An object of this invention is to provide an improved process for the production of vinyl compounds by the reaction of acetylene with organic hydroxy and carboxy compounds. A further object is to provide such a process which may be operated at relatively high reaction temperatures without the formation of undesirable reaction by-products. A third object is to provide improved catalysts for these reactions. Other objects will be apparent from the following description.

The above objects are attained in accordance with the present invention by reacting acetylene with hydroxy or carboxy compounds in the vapor phase in the presence of acidic catalysts which comprise activated carbon impregnated with phosphoric acid, with or without the further addition of suitable metal compounds. It has been found that by the use of such a catalyst, the reaction temperature may be allowed to rise as high as 500° C. with the formation of little or no undesirable reaction by-products. The process in accordance with the present invention may be carried out at a reaction temperature of 200 to 500° C.; it is preferred to operate at about 350 to 400° C., since at this temperature range high yields may be obtained with substantially no formation of undesirable by-products. An advantage of the present invention is that it not only inhibits formation of undesired reaction by-products but also, because of the higher reaction temperatures, results in a greater conversion of the acetylene to the desired compound.

The catalyst employed in practicing the present invention may be simply activated carbon saturated with phosphoric acid or its anhydride or suitable metal compounds known to the art may be incorporated in the catalyst together with the phosphoric acid. Also, if desired, other acids may be added to the catalyst in conjunction with the phosphoric acid. In regard to the addition of metal compounds to the catalyst body these should either be non-alkaline or be added in such quantities that resulting catalyst body has a distinct acidic reaction. It has been found that compounds of zinc, cadmium and silver in general are the most suitable for adding to the phosphoric acid impregnated activated carbon catalyst of the present invention. Such metal compounds may be of salts or oxides of these metals.

The following examples illustrate specific methods of practicing the invention herein described and specific catalysts prepared in accordance herewith:

Example 1

A catalyst body was prepared by impregnating 100 grams of activated carbon with an aqueous solution containing 25 grams of silver nitrate and an acetic acid solution of 20 grams of zinc oxide and finally with 57.2 grams of 85% phosphoric acid. A mixture of acetylene and concentrated acetic acid vapor was passed over the catalyst at a temperature of about 350° C. By condensation of the off gases, a mixture of vinyl acetate and ethylidene diacetate was obtained, the yield being more than 90% of theory, based on the amount of acetylene reacted.

Example 2

Methyl alcohol or ethyl alcohol is reacted with acetylene by the method of Example 1. By this means, excellent yields of methyl vinyl ether or ethyl vinyl ether may be produced.

It is known that heretofore acidic catalysts have been proposed for reacting acetylene with carboxy or hydroxy compounds to prepare vinyl compounds. However, it does not appear that the acidic catalysts heretofore known have been capable of the novel, unexpected and useful results of the present invention, namely, the inhibition of undesired reactions at relatively high reaction temperatures.

The use of activated carbon as a support for the phosphoric acid and other constituents of the catalyst described herein is an essential feature of the present invention. It has been found that these advantageous results are not secured if other known catalyst supports, e. g. pumice are used. The advantageous results obtained by the present invention are surprising and unexpected, in view of the fact that the use of activated carbon alone, not only does not produce the aforesaid advantageous results, but even causes the formation of larger amounts of the undesirable reaction products at temperatures above 200° C. than is caused by the catalysts heretofore known. It appears, therefore, that in some manner not fully understood, the activated carbon promotes the desired selective catalytic action of the phosphoric acid and other constituents of the catalyst and at the same time the undesirable effects of activated carbon used alone are eliminated by the presence of the phosphoric acid.

I claim:

1. A process for the preparation of vinyl compounds comprising reacting acetylene with a compound selected from the group consisting of organic hydroxy compounds and carboxylic acids at a temperature above 200° C. in the presence of a catalyst body comprising activated carbon impregnated with an acidic catalyst comprising a substantial amount of uncombined phosphoric acid.

2. A process for the preparation of vinyl compounds comprising reacting acetylene with a compound selected from the group consisting of alcohols and fatty acids at a temperature above 200° C. in the presence of a catalyst body comprising activated carbon impregnated with an acidic catalyst comprising a substantial amount of uncombined phosphoric acid.

3. A process for the preparation of vinyl esters comprising reacting acetylene with a fatty acid at a temperature of 200 to 500° C. in the presence of a catalyst body comprising activated carbon impregnated with an acidic catalyst comprising a substantial amount of uncombined phosphoric acid.

4. A process for the preparation of vinyl ethers comprising reacting acetylene with an alcohol at a temperature of 200 to 500° C. in the presence of a catalyst body comprising activated carbon impregnated with an acidic catalyst comprising a substantial amount of uncombined phosphoric acid.

5. A process for the preparation of vinyl compounds comprising reacting acetylene with a compound selected from the group consisting of organic hydroxy compounds and carboxylic acids at a temperature of 200 to 500° C. in the presence of a catalyst body comprising activated carbon impregnated with a substantial amount of uncombined phosphoric acid and at least one metal compound selected from the group consisting of salts and oxides of zinc, cadmium and silver.

6. A process for the preparation of vinyl ester comprising reacting acetylene with a fatty acid at a temperature of about 350 to 400° C. in the presence of a catalyst body consisting of activated carbon impregnated with free phosphoric acid.

7. A process for the preparation of vinyl ester comprising reacting acetylene with acetic acid at a temperature of about 350 to 400° C. in the presence of an acidic catalyst body comprising activated carbon impregnated with a substantial amount of uncombined phosphoric acid and at least one metal compound selected from the group consisting of salts and oxides of zinc, cadmium and silver.

8. A process for the preparation of vinyl ester comprising reacting acetylene with a fatty acid at a temperature of about 350 to 400° C. in the presence of an acidic catalyst body comprising activated carbon impregnated with zinc oxide and a substantial amount of uncombined phosphoric acid.

9. A process for the preparation of vinyl ether comprising reacting acetylene with an alcohol at a temperature of about 200 to 500° C. in the presence of a catalyst body comprising activated carbon impregnated with a substantial amount of uncombined phosphoric acid and at least one metal compound selected from the group consisting of salts and oxides of zinc, cadmium and silver.

10. A process for the preparation of vinyl ethers comprising reacting acetylene with an alcohol at a temperature of about 350 to 400° C. in the presence of a catalyst body consisting of activated carbon impregnated with free phosphoric acid.

11. An acidic catalyst body for the production of vinyl compounds from acetylene which comprises activated carbon impregnated with a substantial amount of uncombined phosphoric acid and at least one metal compound selected from the group consisting of salts and oxides of zinc, cadmium and silver.

12. An acidic catalyst body for the production of vinyl compounds from acetylene which comprises activated carbon impregnated with a substantial amount of uncombined phosphoric acid and zinc oxide.

13. An acidic catalyst body for the production of vinyl compounds from acetylene which comprises activated carbon impregnated with acetic acid, zinc oxide, silver nitrate, and a substantial amount of uncombined phosphoric acid.

HANS WALTER.